United States Patent
Zipperer et al.

(10) Patent No.: US 11,573,107 B2
(45) Date of Patent: Feb. 7, 2023

(54) HYDRAULIC SYSTEM FOR ULTRASONIC FLOW MEASUREMENT USING DIRECT ACOUSTIC PATH APPROACH

(71) Applicant: TEXAS INSTRUMENTS INCORPORATED, Dallas, TX (US)

(72) Inventors: Johann Reinhold Zipperer, Unterschleissheim (DE); Peter Wongeun Chung, Frisco, TX (US); Hans Martin Hilbig, Tiefenbach (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 205 days.

(21) Appl. No.: 16/892,561

(22) Filed: Jun. 4, 2020

(65) Prior Publication Data
US 2020/0370935 A1 Nov. 26, 2020

Related U.S. Application Data

(63) Continuation of application No. 15/465,983, filed on Mar. 22, 2017, now Pat. No. 10,690,530.

(60) Provisional application No. 62/427,390, filed on Nov. 29, 2016.

(51) Int. Cl.
*G01F 1/66* (2022.01)

(52) U.S. Cl.
CPC .................. *G01F 1/662* (2013.01)

(58) Field of Classification Search
CPC ....................................................... G01F 1/66
USPC ...................................................... 73/861.28
See application file for complete search history.

(56) References Cited

U.S. PATENT DOCUMENTS

| | | | |
|---|---|---|---|
| 2,364,930 A | | 12/1944 | Turner |
| 4,142,414 A | * | 3/1979 | Cosentino ................. G01F 1/52 73/216 |
| 4,240,292 A | | 12/1980 | Zalessky et al. |
| 4,420,983 A | * | 12/1983 | Langdon ............... G01F 1/8459 73/32 A |
| 5,349,852 A | * | 9/1994 | Kamen ................. F04B 43/043 700/282 |
| 5,575,310 A | * | 11/1996 | Kamen ..................... G01F 1/34 137/565.34 |
| 5,661,232 A | | 8/1997 | Van Cleve et al. |
| 5,675,259 A | | 10/1997 | Arndt et al. |

(Continued)

*Primary Examiner* — Peter J Macchiarolo
*Assistant Examiner* — Mohammed E Keramet-Amircolai
(74) *Attorney, Agent, or Firm* — Krista Y. Chan; Frank D. Cimino

(57) ABSTRACT

A flow meter for determining the flow rate of a fluid through a conduit, including an upper body having an inlet chamber, an acoustic channel, an outlet chamber, a sound wave generator, and a sound wave receiver. The inlet chamber, acoustic channel, and outlet chamber are fluidly connected together and are oriented so as to create a symmetrical fluid pathway through the inlet chamber, the acoustic channel the outlet chamber. The sound wave generator and the sound wave receiver are aligned along a longitudinal axis of the acoustic channel and the sound wave generator is creates a sound wave that moves along the longitudinal axis of the acoustic channel as fluid flows through the acoustic chamber. The receiver detects that sound wave that has moved through the acoustic channel and such information is used to determine the flow rate of the fluid through the flow meter.

20 Claims, 5 Drawing Sheets

(56) References Cited

U.S. PATENT DOCUMENTS

| | | | |
|---|---|---|---|
| 6,053,054 A * | 4/2000 | Wusterbarth | G01F 1/74 73/861.28 |
| 6,056,054 A * | 5/2000 | Brady | E21B 43/385 166/265 |
| 6,338,277 B1 | 1/2002 | Diston et al. | |
| 2003/0024324 A1 | 2/2003 | Hanl et al. | |
| 2003/0097879 A1 | 5/2003 | van Klooster | |
| 2003/0150279 A1 * | 8/2003 | Lentelius | G01F 1/66 73/861.28 |
| 2005/0173354 A1 | 8/2005 | Binot et al. | |
| 2005/0210999 A1 | 9/2005 | Sylvia et al. | |
| 2007/0034016 A1 | 2/2007 | Maginnis et al. | |
| 2007/0227263 A1 | 10/2007 | Fukano et al. | |
| 2008/0029174 A1 * | 2/2008 | Yoshino | F16K 41/12 137/828 |
| 2010/0024569 A1 | 2/2010 | Ehrenberg et al. | |
| 2011/0041621 A1 | 2/2011 | Nakano et al. | |
| 2011/0281378 A1 | 11/2011 | Doehler | |
| 2012/0118074 A1 | 5/2012 | Liao et al. | |
| 2013/0080081 A1 * | 3/2013 | Dugger | G01F 1/667 73/861.25 |
| 2013/0298635 A1 | 11/2013 | Godfrey | |
| 2014/0109688 A1 | 4/2014 | Ebihara | |
| 2014/0216167 A1 | 8/2014 | Nielsen et al. | |
| 2015/0013472 A1 * | 1/2015 | Gill | G01F 1/662 73/861.31 |
| 2015/0042210 A1 | 2/2015 | Nagareda et al. | |
| 2015/0082912 A1 | 3/2015 | Suzuki et al. | |
| 2015/0082913 A1 | 3/2015 | Maruyama et al. | |
| 2015/0300861 A1 * | 10/2015 | Regen | G01F 15/12 73/37 |
| 2016/0003655 A1 | 1/2016 | Galvez | |
| 2016/0093280 A1 | 3/2016 | Ueberschlag et al. | |
| 2017/0009788 A1 | 1/2017 | Sawchuk | |

* cited by examiner

HYDRAULIC SYSTEM FOR ULTRASONIC FLOW MEASUREMENT USING DIRECT ACOUSTIC PATH APPROACH

CROSS-REFERENCE TO RELATED APPLICATIONS

This application is a continuation of U.S. patent application Ser. No. 15/465,983, filed Mar. 22, 2017, which claims priority to, and the benefit of, U.S. Provisional Patent Application No. 62/427,390, filed Nov. 29, 2016, each of which is hereby incorporated by reference in its entirety.

This application pertains to flow meters, particularly to the measurement of liquid flow using sound waves, and more particularly to a device and method for measuring the flow rate of liquid using ultrasonic waves.

BACKGROUND

The measurement of liquid flow through a pipe is commonly used in many domestic and industrial applications. The flow rate of a liquid through a pipe is typically measured by use of a flow meter. These flow meters include a body that is connected in-line with the flow of liquid in the pipe. A rotation turbine is connected to the body and the rate of rotation of the turbine caused by the flow of the liquid through the flow meter is used to determine the flow rate of a liquid through the pipe. Examples of these turbine-type flow meters are illustrated in US 2003/0024324 and the references cited therein. Although these turbine-type flow meters are commonly used, these flow meters contain moving parts that wear out over time, thereby adversely affecting proper flow rate measurements and/or result in complete failure of the flow rate meter. In view of the current state of flow rate meters, there is a need for a flow rate meter that has fewer or no moving parts and optionally can be easily substituted in the housing or body of existing flow rate meters.

SUMMARY

The flow meter in accordance with the present disclosure includes an acoustic channel that includes an electroacoustic transducer and an acoustic receiver, and wherein sound waves that are generated by the electroacoustic transducer move generally parallel to the flow path of the liquid flowing through the acoustic channel, and the flow meter has a symmetrical liquid flow path for the liquid that enters and exits the acoustic channel. The electroacoustic transducer can be configured to generate an ultrasonic signal in the acoustic channel. As defined herein, an ultrasonic signal or ultrasonic sound wave has a frequency of over 20,000 Hz, typically around 1 MHz. The acoustic channel generally is a straight channel wherein the electroacoustic transducer and the acoustic receiver are generally aligned in the central longitudinal axis of the acoustic channel and a straight, continuous, uninterrupted liquid path exists between the electroacoustic transducer and the acoustic receiver. The configuration of the inlet portion of the flow meter that is fluidly connected to the acoustic channel is sized and shaped the same as the outlet portion of the flow meter that is fluidly connected to the acoustic channel so as to avoid and compensate for phase distortions of the liquid flow as the liquid enters the acoustic channel, flows through the acoustic channel, and exits the acoustic channel. As such, the wave front of the sound wave that travels through the acoustic channel is generally uniform when it is received by the acoustic receiver. In such a configuration, the path length of the fluid along a first surface portion of wall from the inlet portion to the outlet portion is the same as the path length of the fluid along a second surface portion of the wall that is located diametrically opposite the first surface portion. The flow meter is generally configured to measure the flow rate of fluids. The type of liquid that can be used with the flow meter is generally not limited.

DETAILED DESCRIPTION

Figure 1:
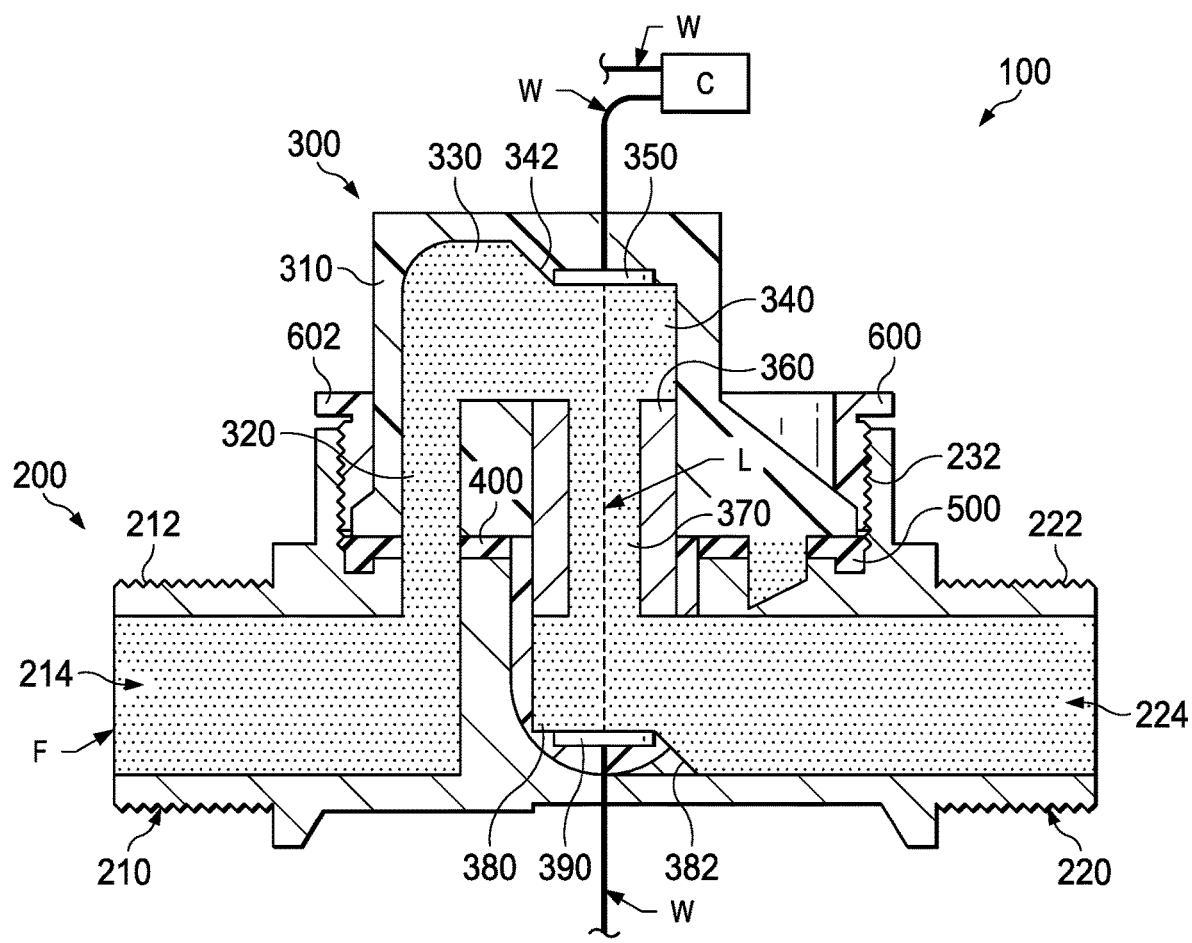
FIG. 1 is a cross-sectional view of the flow meter according to an embodiment.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function. In the drawings, the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " In addition, the terms "couple", "coupled" or "couples" are intended to include indirect or direct electrical or mechanical connection or combinations thereof. For example, if a first device couples to or is coupled with a second device, that connection may be through a direct connection, or through an indirect connection via one or more intervening devices and connections. The singular forms "a", "an", and "the" include plural referents unless the context clearly dictates otherwise.

Figure 2:
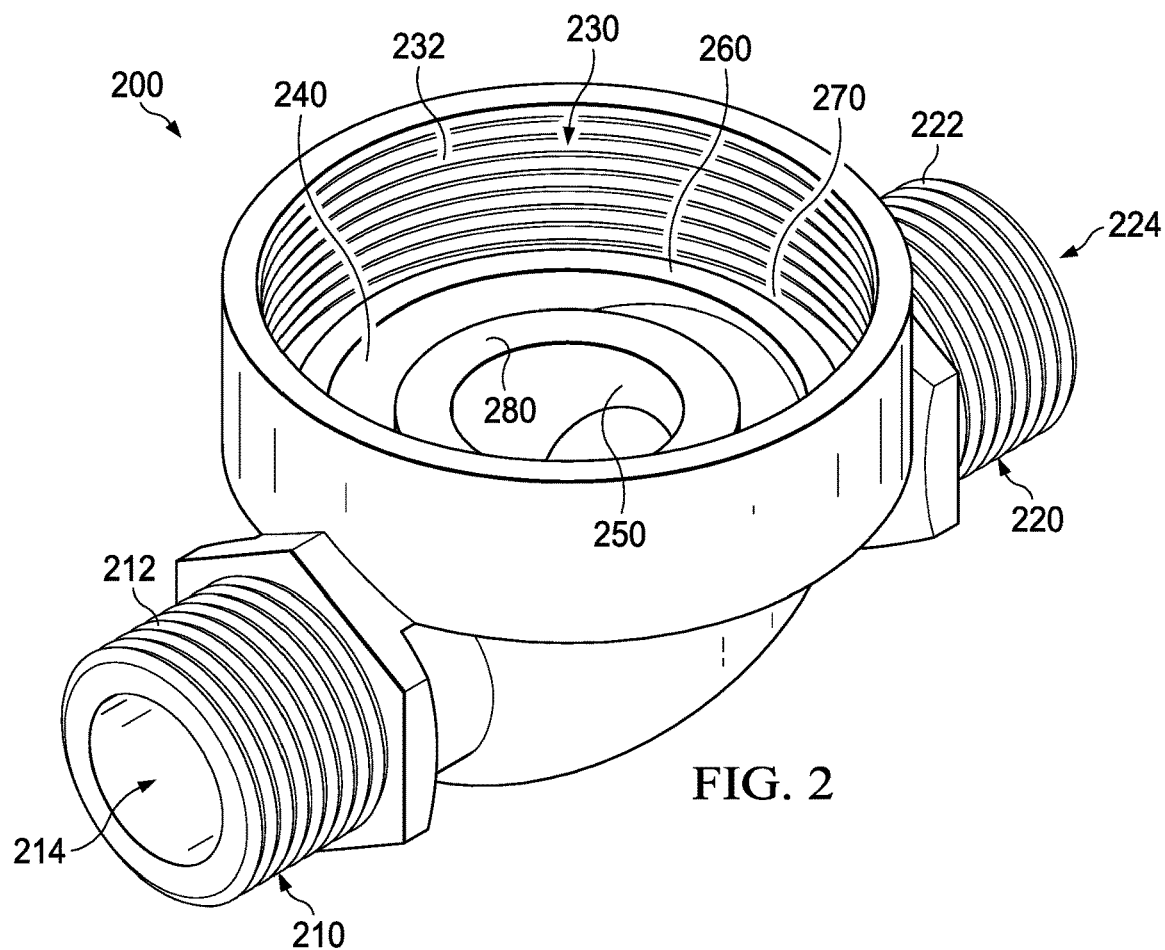
FIG. 2 is a front elevation view of the lower body of the flow meter in accordance with FIG. 1.
Figure 3:
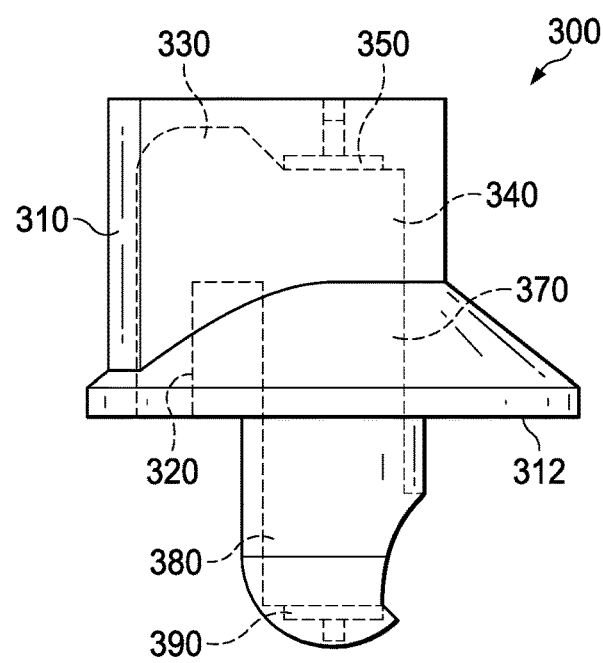
FIG. 3 is side plan view of the upper body of the flow meter in accordance with FIG. 1.

FIGS. 1-3 illustrate one non-limiting embodiment of a flow meter 100 that includes a lower body 200 and an upper body 300. The flow meter is configured to measure the flow rate of a liquid in a pipe or other type of fluid conduit to which the flow meter 100 is connected. The flow meter is configured to measure liquid flow rate by use of sound waves as opposed to the use of a turbine that is used in prior art flow meters. Flow meter 100 typically includes no rotating and/or moving parts to measure the flow rate of liquid; however, this is not required. The size and materials used for the flow meter are non-limiting.

Referring now to FIGS. 1-2, the lower body 200 is configured to be connected in-line to a pipe or other fluid conduit (not shown). The lower body is generally formed of a durable material such as, but not limited to, a metal (e.g., brass, etc.) or a plastic material. As best illustrated in FIG. 2 the lower body includes an inlet connector 210 and an outlet connector 220. The type of connection formed by the inlet and outlet connector is non-limiting. As illustrated in FIG. 2, the inlet connector includes threading 212; however, this is not required. Likewise, the outlet connector includes threading 222; however, this is not required. The inlet connector includes an inlet interior passageway 214 that is fluidly connected to interior cavity 230 of the lower body to enable a liquid F to enter the interior cavity 230. The outlet connector also includes an outlet interior passageway 224 that is fluidly connected to interior cavity 230 of the lower body.

The inner surface of cavity wall 232 of the interior cavity 230 is illustrated as including threading that is used to releasably connect upper body 300 to lower body 200; however, this is not required. As can be appreciated, other or additional arrangements can be used to releasably connect upper body 300 to lower body 200. The interior cavity includes an outer recess 240 and a central opening 250. The inlet interior passageway 214 is fluidly connected to outer recess 240. The outer recess is illustrated as fully encircling central opening 250; however, this is not required. The outer recess is also illustrated as having a variable depth wherein the region of the outer recess that is closest to the opening of the interior passage into the outer recess has a greater depth than one or more other regions of the outer recess; however, this is not required. FIG. 2 illustrates that the depth of the region of the outer recess that is closest to the opening of the interior passage into the outer recess is the greatest and the depth of the outer recess on the opposite side of the central opening 250 has the smallest depth; however, this is not required. The central opening 250 is illustrated has having a circular cross-sectional shape; however, this is not required. The central opening is fluidly connected to outlet interior passageway 224 of the outlet connector 220. The interior cavity 230 of the lower body includes a lower landing 260 that encircles outer recess 240. The top surface of the lower landing is generally the same height as the top surface of cavity wall 280 that encircles the central opening 250; however, this is not required. A groove 270 optionally exists between lower landing 260 and the inner surface of wall 232 of the inner cavity.

Referring now to FIGS. 1 and 3, the upper body 300 is configured to be releasably connected to the lower body 200; however, this is not required. The upper body is also generally formed of a durable material such as, but not limited to, a metal material or plastic material. The upper body includes a housing 310 having a lower surface 312. The cross-sectional size and shape of the lower portion of the lower body is configured so that that the lower portion can be at least partially inserted into interior cavity 230 to be releasably connected to the lower body; however this is not required. The upper body can optionally be configured to replace a turbine-based flow meter without having to replace the lower body of the turbine-based flow meter; however, this is not required. When the upper body is configured to replace a turbine-based flow meter, the upper body of the turbine-based flow meter that includes the turbine component is removed from the lower body of the turbine-based flow meter, and the upper body of the flow meter in accordance with the present disclosure is at least partially inserted into and releasably connected to the lower body of the turbine-based flow meter. Such a configuration of the upper body allows for simple replacement of turbine-based flow meters with the upper body of the flow meter in accordance with the present disclosure.

An inlet passage 320 is located in the housing 310 and is configured to be fluidly connected to outer recess 240 when the upper body is connected to the lower body. A core gasket 400 and an outer gasket 500 are used to inhibit or prevent liquid from directly flowing from outer recess 240 into central opening 250 of the lower body when the upper body is connected to the lower body. The core gasket is positioned on the top surface of cavity wall 280 and forms a liquid seal with lower surface 312 when the upper body is connected to the lower body. The outer gasket is positioned on the top surface of lower landing 260 and groove 270 and forms a liquid seal with lower surface 312 when the upper body is connected to the lower body. Groove 270 can be used to secure the outer gasket in position in the interior cavity 230; however, this is not required. The material used to form the core gasket 400 and the outer gasket 500 is non-limiting. Generally, the core gasket 400 and the outer gasket 500 are formed of an elastomeric material; however, this is not required.

The upper end of the inlet passage 320 terminates into the inlet portion 330 of the upper body. The average and maximum cross-sectional area of the inlet portion 330 is greater than the average and maximum cross-sectional area of the inlet passage; however, this is not required. The flow direction of liquid from the inlet passage 320 changes when the liquid enters the inlet portion 330. As illustrated in FIG. 1, the flow direction of the liquid from the passage 320 to the inlet portion 330 changes about 90°; however, the change in flow direction can be other than 90°. The maximum cross-sectional area of the inlet portion 330 can be about the same as the average cross-sectional area of the inlet interior passageway 214 of lower base 200; however, this is not required. Likewise, the cross-sectional shape of the inlet portion 330 can be the same as the cross-sectional shape of the inlet interior passageway 214 of lower base 200; however, this is not required.

The inlet portion 330 terminates into the inlet chamber 340. As illustrated in FIGS. 1 and 3, the beginning of the inlet portion can narrow in cross-sectional area prior to terminating into the acoustic channel 370; however, this is not required. As illustrated in FIGS. 1 and 3, the front or beginning portion of the inlet chamber 340 includes a sloped surface 342 which causes a reduction in cross-sectional area of the inlet chamber prior to the liquid entering the acoustic channel. The sloped region can be located only on a particular portion of the inlet chamber (e.g., the top, front region of the inlet chamber as illustrated in FIGS. 1-3), or be located on the complete inner perimeter of the front portion of the inlet chamber. The sloped region (when used) generally exists along about 1%-50% (and all values and ranges therebetween) of the longitudinal length of the inlet chamber, and typically about 2-40% of the longitudinal length of the inlet chamber. In one non-limiting arrangement, the sloped region (when used) generally exists along less than 30% of the longitudinal length of the inlet chamber (e.g., 10%-28%). The sloped surface (when used) is generally a constant angled slope; however, this is not required. The reduction in cross-sectional area of the inlet chamber as a result of the slope is generally 5-60% (and all values and ranges therebetween), and typically about 10%-45%. As illustrated in FIGS. 1-3, the inlet portion 330 has a generally constant cross-sectional size and shape along the full longitudinal length of the inlet portion; however, this is not required.

As illustrated in FIGS. 1 and 3, the acoustic channel 370 is positioned below the inlet chamber 340; however, this is not required. The acoustic channel 370 is oriented relative to the inlet chamber 340 such that the flow direction of liquid from the inlet chamber changes when the liquid enters the acoustic channel 370. As illustrated in FIG. 1, the flow direction of the liquid from the inlet chamber 340 to the acoustic channel 370 changes about 90°; however, the change in flow direction can be other than 90°. The cross-sectional area of the inlet chamber 340 that terminates into the acoustic channel 370 can be about the same as or greater than the minimum cross-sectional area of the acoustic channel 370; however, this is not required. As illustrated in FIG. 1, the cross-sectional area of the mid-portion of the acoustic channel 370 is less than the cross-sectional area of the inlet chamber 340 that terminates into the acoustic channel 370; however, this is not required.

At the top portion of the inlet chamber 340 there is located a first electroacoustic transducer/receiver 350. The size, shape, configuration and material of the first electroacoustic transducer/receiver 350 are non-limiting. The first electroacoustic transducer/receiver can be in contact with the liquid flowing through the inlet chamber or be isolated from the liquid flowing through the inlet chamber. In one non-limiting embodiment, the first electroacoustic transducer/receiver 350 is configured to generate an ultrasonic signal that moves along the longitudinal axis of the acoustic channel 370 as the liquid flows through the acoustic channel 370. In addition or alternatively, the first electroacoustic transducer/receiver 350 can be configured to receive an ultrasonic signal that moves along the longitudinal axis of the acoustic channel 370 as the liquid flows through the acoustic channel 370.

The acoustic channel 370 is generally a straight channel from end to end. The acoustic channel 370 generally has a constant cross-sectional area and cross-sectional shape along the longitudinal length of the acoustic chamber; however, this is not required.

An orifice 360 can optionally be inserted in the acoustic channel 370 as illustrated in FIG. 1. The orifice 360 (when used) is positioned in the acoustic channel 370 at or below the lower edge of the inlet chamber 340 that terminates into the acoustic channel 370; however, this is not required. Also, the orifice 360 (when used) is positioned in the acoustic channel 370 at or above the upper edge of the outlet chamber 380 into which acoustic channel 370 terminates; however, this is not required. The material used to form the orifice is non-limiting. In one non-limiting embodiment, the orifice can be formed of a sound damping material (e.g., Teflon®, etc.) used to dampen the sound wave reflections as a sound wave moves through the acoustic channel 370; however, this is not required. The orifice can also or alternatively be used to increase the flow rate of the liquid through the acoustic channel. The means by which the orifice is connected to the inner wall of the acoustic channel is non-limiting (e.g., adhesive, melted connection, friction connection, mechanical connection, coating, etc.). The orifice (when used) generally reduces the cross-sectional area of the acoustic channel 370 by about 0.01-60% (and all values and ranges therebetween), and typically about 0.05-45%. Generally, the cross-sectional shape and cross-sectional area of the fluid passageway through the orifice is constant along the longitudinal length of the orifice; however, this is not required. The central longitudinal axis of the fluid passageway through the orifice is generally the same as the central longitudinal axis L of the acoustic channel 370; however, this is not required.

Located at the bottom of the outlet chamber 380 is a second electroacoustic transducer/receiver 390. The size, shape, configuration and material of the second electroacoustic transducer/receiver 390 are non-limiting. The second electroacoustic transducer/receiver can be in contact with the liquid flowing through the outlet chamber 380 or can be isolated from the liquid flowing through the outlet chamber. In one non-limiting embodiment, the second electroacoustic transducer/receiver 390 is configured to generate an ultrasonic signal that moves along the longitudinal axis of the acoustic channel 370 as the liquid flows through the acoustic channel 370. In addition or alternatively, the second electroacoustic transducer/receiver 390 can be configured to receive an ultrasonic signal that moves along the longitudinal axis of the acoustic channel 370 as the liquid flows through the acoustic channel 370. In one non-limiting configuration, the first electroacoustic transducer/receiver 350 and the second electroacoustic transducer/receiver 390 are configured such that both electroacoustic transducers are capable of generating a sound wave and receiving a sound wave; however, this is not required. In another non-limiting configuration, the first electroacoustic transducer/receiver 350 is configured such that only the first electroacoustic transducer/receiver 350 is capable of generating a sound wave and the second electroacoustic transducer/receiver 390 is only capable of receiving a sound wave; however, this is not required. In another non-limiting configuration, the second electroacoustic transducer 390 is configured such that only the second electroacoustic transducer/receiver 390 is capable of generating a sound wave and the first electroacoustic transducer/receiver 350 is only capable of receiving a sound wave; however, this is not required. In another non-limiting configuration, the first electroacoustic transducer/receiver 350 or the second electroacoustic transducer/receiver 390 can be substituted for a sound reflecting surface and only a single electroacoustic transducer/receiver is positioned at the top portion of the inlet chamber or the bottom portion of the outlet chamber and such single electroacoustic transducer/receiver is configured to generate a sound wave and also to receive the reflected sound wave; however, this is not required. As illustrated in FIG. 1, the first electroacoustic transducer/receiver 350 and the second electroacoustic transducer/receiver 390 are centered along the central longitudinal axis L of the acoustic channel 370; however, this is not required. The first electroacoustic transducer/receiver 350 and/or the second electroacoustic transducer/receiver 390 are configured to generate a sound wave SW that moves generally parallel to the central longitudinal axis L of the acoustic channel 370; however, this is not required. Generally, the first electroacoustic transducer/receiver 350 and the second electroacoustic transducer/receiver 390 have the same shape, size and configuration; however, this is not required. Generally, the first electroacoustic transducer/receiver 350 and the second electroacoustic transducer/receiver 390 are positioned in the upper body so as to not obstruct the flow of liquid through the flow meter; however, this is not required. The first and second electroacoustic transducers/receivers are typically powered by electric current. The power supply for the first and second electroacoustic transducers/receivers can be located on or in the upper body and/or be located external to the upper body. The power supply is non-limiting (e.g., battery, solar power battery, power line, etc.). Standard power leads are generally used to connect the first and second electroacoustic transducers/receivers to the power supply.

The outlet chamber 380 has a configuration that is the same as the configuration of the inlet chamber 340. However, the outlet chamber 380 has a sloped surface 382 that results in the widening of the cross-sectional area of the outlet chamber prior to terminating into the outlet interior passageway 224 of the outlet connector 220 of the lower body 200; however, this is not required. The sloped region can be located only on a particular portion of the outlet chamber (e.g., the bottom, end region of the outlet chamber as illustrated in FIGS. 1-3), or be located on the complete inner perimeter of the end portion of the outlet chamber. The sloped region (when used) generally exists along about 1%-50% (and all values and ranges therebetween) of the longitudinal length of the outlet chamber, and typically about 2-40% of the longitudinal length of the outlet chamber. In one non-limiting arrangement, the sloped region (when used) generally exists along less than 30% of the longitudinal length of the outlet chamber (e.g., 10%-28%). The sloped surface (when used) is generally a constant angled slope; however, this is not required. The increase in cross-sectional area of the outlet chamber as a result of the slope is generally 5-60% (and all values and ranges therebetween), and typically about 10%-45%. In one non-limiting embodiment, the shape, size and configuration of the inlet chamber and the outlet chamber are symmetrical. As will be described in more detail below, the symmetry of the inlet and outlet chambers results in a generally uniform sound wave front as the sound wave travels through the acoustic channel. As illustrated in FIG. 1, the flow direction of the liquid entering the inlet channel is the same as the flow direction of the liquid exiting the outlet chamber. Also, the longitudinal axis of the liquid flow entering the inlet chamber is parallel to the longitudinal axis of the liquid flow exiting the outlet chamber. In another non-limiting embodiment, the cross-sectional size and shape of the inlet portion 330 of the upper body is generally the same as the cross-sectional size and shape of the outlet interior passageway 224 of the outlet connector 220 of the lower body 200; however, this is not required. Generally, the longitudinal length of the outlet interior passageway 224 of the outlet connector 220 of the lower body 200 is greater than the longitudinal length of the inlet portion 330 of the upper body; however, this is not required.

Referring now to FIGS. 1-3, the lower section of the upper body 300 is configured to be at least partially inserted into central opening 250 of the lower body 200 such that the end of the outlet chamber is aligned with the outlet interior passageway 224 of the outlet connector 220 of the lower body 200. The upper body 300 can be releasably secured to the lower body by a variety of means. One non-limiting means is illustrated in FIG. 1, wherein a lock screw 600 is used to releasably secure the upper body to the lower body. The lock screw includes threads 602 on the outer surface that are configured to engage with the threads on the inner surface of cavity wall 232. During assembly, the upper body is at least partially inserted in the lower body as described above. Thereafter, the lock screw is inserted over a portion of the upper body and then threadedly connected the lower body. As the lock screw is tightened on the lower body, the lock screw forces the upper body downwardly onto the lower body to thereby releasably secure the upper body to the lower body. As discussed above, the core gasket 400 and the outer gasket 500 are used to inhibit or prevent liquid from directly flowing from outer recess 240 into central opening 250 of the lower body when the upper body is connected to the lower body.

Once the upper body is releasably connected to the lower body, the liquid that flows into the inlet interior passageway 214 of the lower body is directed into the outer recess 240 in the interior cavity 230 of the lower body. The liquid then flows from the outer recess 240 into the inlet passage 320 in the housing 310 of the upper body. The liquid then flows from the inlet passage 320 into the inlet chamber 340. The liquid then flows from the inlet chamber, into and through the acoustic channel, and into the outlet chamber. As the liquid flows through the acoustic channel, the liquid is at least periodically subjected to a sound wave such as an ultrasonic sound wave. The liquid then flows from the outlet chamber into the outlet interior passageway 224 of the lower body.

Figure 4:
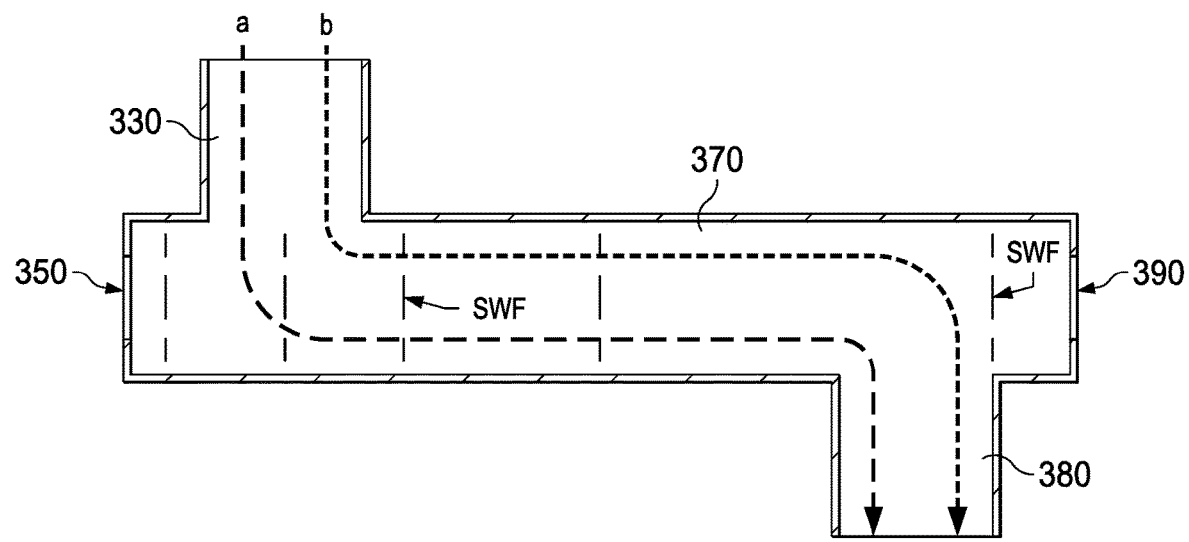
FIG. 4 is a schematic view generally representing the flow path of liquid into, through, and out from the acoustic channel of a flow meter and the wave front of the sound wave moving through the acoustic channel of the flow meter having a symmetrical fluid channel configuration.
Figure 5:
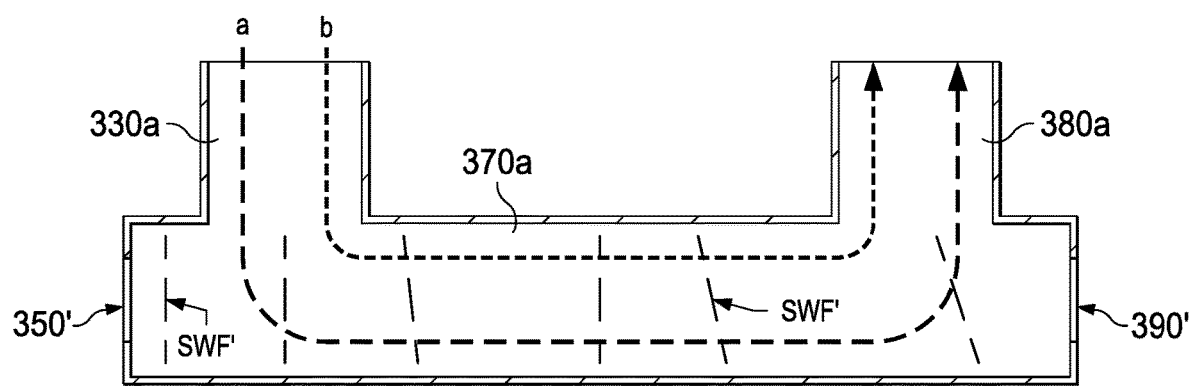
FIG. 5 is a schematic view generally representing the flow path of liquid into, through, and out from the acoustic channel of a flow meter and the wave front of the sound wave moving through the acoustic channel of the flow meter having a non-symmetrical fluid channel configuration.

As illustrated in FIGS. 1 and 3, the inlet chamber, acoustic channel and outlet chamber are aligned on a symmetrical axis. The first electroacoustic transducer/receiver and the second electroacoustic transducer/receiver are symmetrically oriented with respect to one another. The inlet and outlet chambers are symmetrically oriented with respect to one another. The cross-sectional area and cross-sectional shape of the inlet portion 330 and the outlet interior passageway 224 of lower base 200 are the same. The orifice, acoustic channel, inlet chamber and outlet chamber are aligned with one another along the central longitudinal axis L of the acoustic channel. As such, the length of liquid flow paths through the inlet chamber, outlet chamber and acoustic channel are generally the same. This is illustrated in FIGS. 4 and 5. FIG. 4 illustrates two liquid flow paths a and b. Due to the symmetry of the inlet chamber, outlet chamber and acoustic channel, the length of the flow path of the liquid is shown to be the same. FIG. 5 also illustrates two liquid flow paths a' and b'. Although the shape and size of inlet chambers 330, 330a, outlet chamber 380, 380a, and acoustic channel 370, 370a are generally the same, the length of the liquid flow paths through the orientations of the inlet chamber, outlet chamber and acoustic channel are not the same. As illustrated in FIG. 5, the flow length of liquid path b' is less than the length of liquid flow path a'. This is because the inlet chamber, outlet chamber and acoustic channel are not symmetrically oriented in accordance with the present disclosure. FIGS. 4 and 5 also illustrate the sound wave front SWF, SWF' as the sound wave moves through the liquid as the liquid moves through the acoustic channel. As illustrated in FIG. 4, the first electroacoustic transducer/receiver 350 generates a sound wave and the vertical dashed lines illustrate the movement of the sound wave front SFW through the inlet chamber, through the acoustic channel, through the outlet chamber and then received by the second electroacoustic transducer/receiver 390. The sound wave front SFW is illustrated as moving at generally a constant speed through the inlet chamber. The sound wave front SFW is also illustrated as accelerating in speed through the acoustic channel due to the increase flow rate of the liquid through the acoustic channel due to the orifice. As the sound wave moves through the inlet chamber, outlet chamber and acoustic channel, the sound wave front SFW remains generally perpendicular to the flow direction of the liquid through the inlet chamber, outlet chamber and acoustic channel. FIG. 5 illustrates that the sound wave front SFW' does not remain generally perpendicular to the flow direction of the liquid through the inlet chamber, outlet chamber and acoustic channel because of the different flow path lengths of the liquid through the inlet chamber, outlet chamber and acoustic channel. The non-perpendicular sound wave front SFW', when received by the second electroacoustic transducer/receiver 390', results in distorted readings as to the time period taken for the sound wave to travel a certain distance between the first and second electroacoustic transducer/receivers.

Figure 6A:
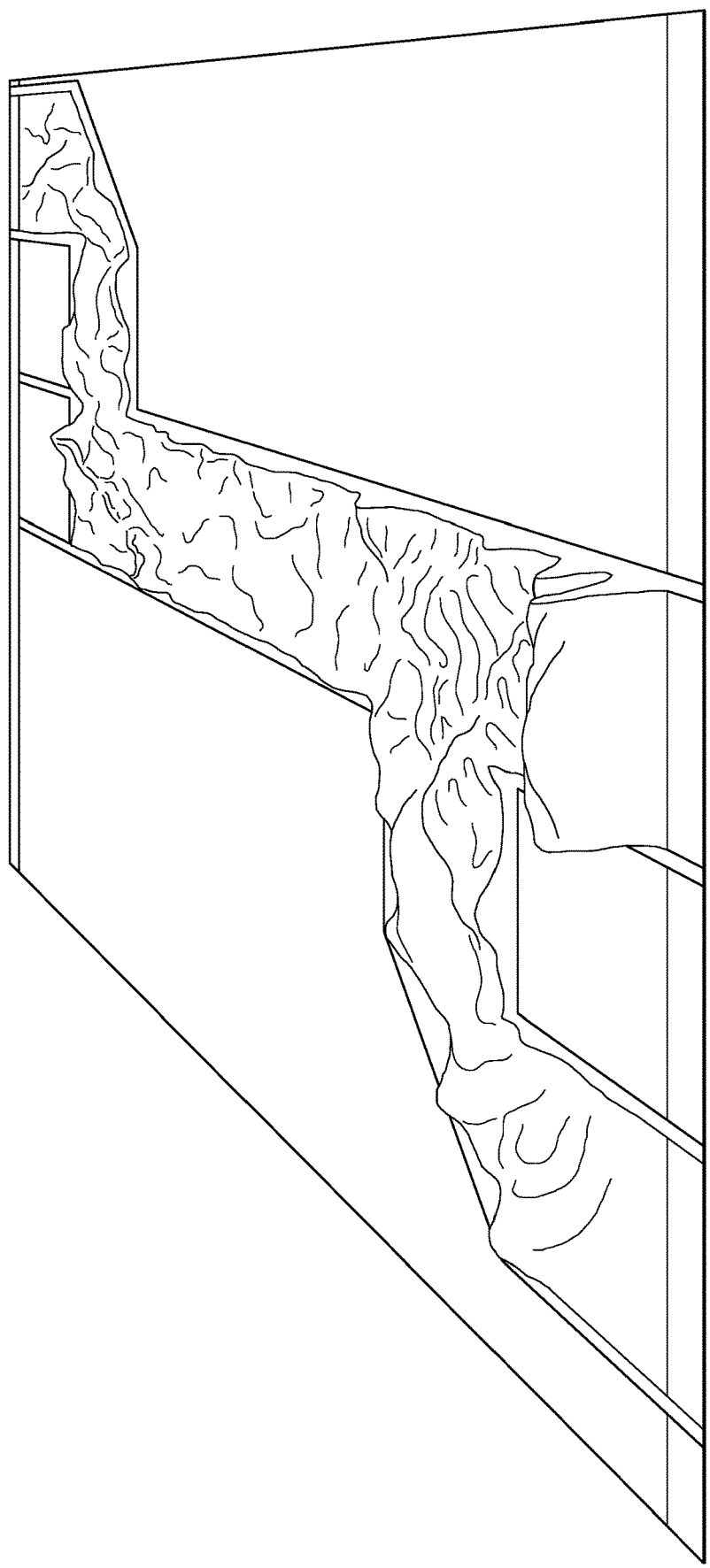
FIGS. 6A and 6B are illustrations of the wave fronts of the sound wave moving through the acoustic channel of the liquid flow path of FIGS. 4 and 5, respectively.
Figure 6B:
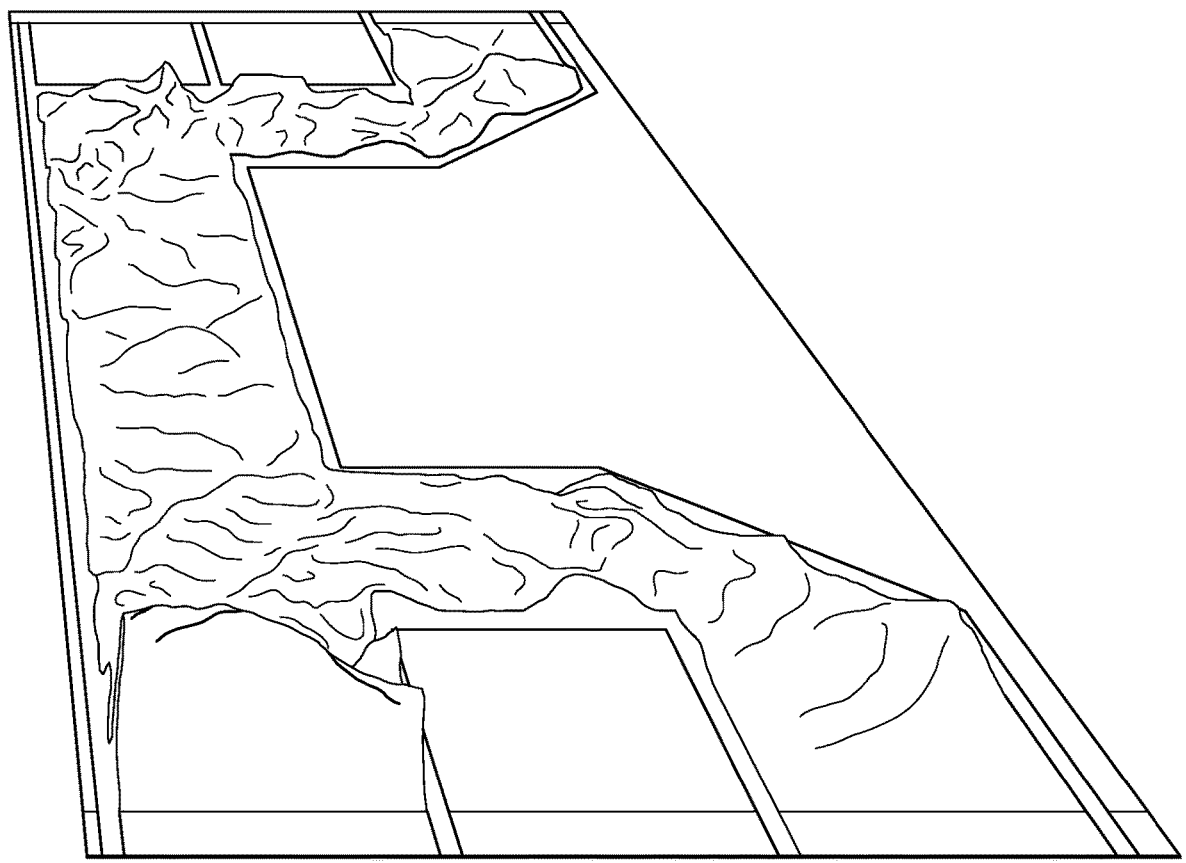

The symmetrical liquid pathway through the inlet chamber, acoustic channel and outlet chamber eliminates or compensates for phase delays for 1) the liquid flow through the inlet chamber, acoustic channel and outlet chamber, 2) the liquid pressure wave caused by flow rate changes of the liquid through the inlet chamber, acoustic channel and outlet chamber, and 3) the sound waves as they moves through the inlet chamber, acoustic channel and outlet chamber. As such, the symmetry of the inlet and outlet chambers results in a generally uniform sound wave front as the sound wave travels through the acoustic channel. FIG. 6A is a two-dimensional simulation of the shape of the sound wave front that is received by the second electroacoustic transducer/receiver 390 due to the symmetry of the inlet chamber, outlet chamber and acoustic channel, and the generally same length of the flow path of the liquid through the inlet chamber, outlet chamber and acoustic channel. As illustrated in FIG. 6A, the height of the sound wave front is generally uniform. FIG. 6B is a two-dimensional simulation of what the shape of the sound wave front that is received by the second electroacoustic transducer/receiver 390' due to the non-symmetry of the inlet chamber, outlet chamber and acoustic channel, and the different lengths of the flow path of the liquid through the inlet chamber, outlet chamber and acoustic channel. As illustrated in FIG. 6B, the height of the sound wave front is not uniform and tapers off to one side.

In operation, the first electroacoustic transducer/receiver 350 and/or the second electroacoustic transducer/receiver 390 generates a sound wave such as an ultrasonic sound wave along the central longitudinal axis L of the acoustic channel as fluid flows through the acoustic channel. The electroacoustic transducer/receiver that is located opposite the electroacoustic transducer/receiver that generated the sound wave is configured to receive the sound wave that has moved through the liquid that is flowing through the acoustic channel. The liquid flow through the acoustic channel acts as a phase shifter to the sound wave that is moving through the liquid. The optional use of an orifice in the acoustic channel can cause additional phase shifting of the sound wave as it moves through the acoustic channel and/or be used to dampen sidewall reflection of the sound wave as the sound wave moves through the acoustic channel. When the electroacoustic transducer/receiver receives the sound wave that has passed through the liquid that is flowing through the acoustic channel, the phase change of the sound wave is measured based on the known distance that the sound wave has traveled and the differential in time as a result of the phase change of the sound wave is used to determine the flow rate of the liquid through the flow meter. In one non-limiting embodiment, the sound waves through the acoustic channel are intermittently generated. Although the symmetry of the liquid pathway through the inlet chamber, acoustic channel and outlet chamber reduces sound wave interference, some interference does exist. By periodically terminating the sound wave generation through the acoustic channel, such interference is allowed to dissipate such that when a new sound wave is generated, a more accurate sound wave is received by the receiver for use in measurement of the flow rate of the liquid through the acoustic channel. In one non-limiting embodiment, there is a 1-100 microsecond (and all values and ranges therebetween) pause between each sound wave generated by the electroacoustic transducer/receiver. As can be appreciated, the pause can be greater than 100 microseconds; however, this is not required. Generally, the length of the pause between the generation of a new sound wave is at least the time period that the electroacoustic transducer/receiver that is receiving the sound wave does not further detect the sound wave that was previously generated by the other electroacoustic transducer/receiver. As such, interference from a plurality of different sound waves is reduced or eliminated. As can be appreciated, the electroacoustic transducer/receiver can generally produce different frequency sound waves to also overcome any interference caused by reflection of the sound waves in the inlet chamber, acoustic channel and outlet chamber; however, this is not required. An electronic system C that generally includes a controller and/or a processor is configured to control an operation of the first and/or second first electroacoustic transducer/receiver. Generally the electronic system C is connected to the first and/or second first electroacoustic transducer/receiver by one or more wires W or the like. The electronic system C can be used to control the operation, sound wave frequency, and/or how often a sound is generated by the first and/or second first electroacoustic transducer/receiver. The electronic system C can be used to receive a signal from the first and/or second first electroacoustic transducer/receiver that receives the sound wave. The electronic system C can be used to calculate the flow rate of the liquid through the flow meter. The electronic system C can be located on or in the upper body or be located external to the upper body. The electronic system C is generally powered by a power supply that can be located on or in the upper body or be located external to the upper body. Wired and/or wireless communication can optionally be included with the flow meter to transmit flow rate information and/or other types of information to a remote location. The flow meter can optionally include a display that can provide flow rate information and/or other types of information.

It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosed examples have been described with reference to preferred and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be said to fall therebetween. The disclosure has been described with reference to the preferred embodiments. These and other modifications of the preferred embodiments as well as other embodiments of the disclosure will be obvious from the disclosure herein, whereby the foregoing descriptive matter is to be interpreted merely as illustrative of the disclosure and not as a limitation. It is intended to include all such modifications and alterations insofar as they come within the scope of the appended claims.

What is claimed:

1. A flow meter apparatus comprising:
an upper body configured to couple to a lower body, wherein the upper body includes:
an inlet passage configured to fluidly couple to an inlet interior passageway of the lower body when the upper body is coupled to the lower body;
an inlet chamber coupled to the inlet passage;
an acoustic channel that includes a first end coupled to the inlet chamber and a second end, wherein the inlet chamber and the acoustic channel are arranged so that, when a fluid is flowing through the flow meter apparatus, the fluid enters the inlet chamber in a first direction and the fluid exits the inlet chamber and enters the acoustic channel in a second direction that is substantially perpendicular to the first direction;
an outlet chamber coupled to the second end of the acoustic channel;
a sound wave generator configured to transmit a sound wave through the acoustic channel; and
a sound wave receiver configured to receive the sound wave transmitted by the sound wave generator.

2. The flow meter apparatus of claim 1, wherein the sound wave generator is disposed within the inlet chamber and the sound wave receiver is disposed within the outlet chamber.

3. The flow meter apparatus of claim 1, wherein the sound wave generator and the sound wave receiver are disposed along a central longitudinal axis of the acoustic channel.

4. The flow meter apparatus of claim 1, further comprising a processor coupled to the sound wave generator and the sound wave receiver and configured to:
drive the sound wave generator to produce the sound wave;
receive, from the sound wave receiver, a signal in response to the sound wave; and
determine a flow rate of the fluid based on the signal from the sound wave receiver.

5. The flow meter apparatus of claim 1, wherein the sound wave is an ultrasonic sound wave.

6. The flow meter apparatus of claim 1, wherein the inlet chamber includes a tapered portion that reduces the inlet chamber in a direction towards the acoustic channel.

7. The flow meter apparatus of claim 1, wherein the upper body includes an outer wall that includes a tapered portion configured to engage a lock screw and thereby releasable secure the upper body to the lower body when the lock screw is engaged with the lower body.

8. The flow meter apparatus of claim 1, wherein:
the upper body includes a protrusion that includes a portion of the acoustic channel and the outlet chamber; and
the protrusion is configured to extend into a recess of the lower body when the upper body is coupled to the lower body.

9. The flow meter apparatus of claim 8, wherein the protrusion is configured such that the outlet chamber is fluidly coupled to an outlet interior passageway of the lower body when the upper body is coupled to the lower body.

10. The flow meter apparatus of claim 1, further comprising the lower body.

11. The flow meter apparatus of claim 10, wherein:
the lower body includes an outlet interior passageway configured to fluidly couple to the outlet chamber of the upper body when the upper body is coupled to the lower body; and
the outlet interior passageway is substantially in line with the inlet interior passageway.

12. The flow meter apparatus of claim 1, wherein the inlet chamber includes a portion that extends beyond the acoustic channel such that the inlet chamber and the acoustic channel form a tee junction.

13. A device comprising:
an inlet chamber;
an acoustic channel having a first end coupled to the inlet chamber and a second end, wherein the inlet chamber and the acoustic channel are arranged so that, when a fluid is flowing through the device, the fluid enters the inlet chamber in a first direction and the fluid exits the inlet chamber and enters the acoustic channel in a second direction that is substantially perpendicular to the first direction, wherein the inlet chamber comprises a first dead-end portion that extends past a first side of the acoustic channel in the first direction;
an outlet chamber coupled to the second end of the acoustic channel, wherein the inlet chamber, the acoustic channel, and the outlet chamber are fluidly connected together to provide a fluid pathway through the inlet chamber, the acoustic channel, and the outlet chamber, wherein the outlet chamber comprises a second dead-end portion that extends past a second side of the acoustic channel in a direction opposite the first direction;
a sound wave generator configured to transmit a sound wave through the acoustic channel; and
a sound wave receiver configured to receive the sound wave transmitted by the sound wave generator.

14. The device of claim 13, wherein the sound wave generator is disposed at the first end of the acoustic channel and the sound wave receiver is disposed at the second end of the acoustic channel.

15. The device of claim 13, wherein the sound wave generator and the sound wave receiver are disposed along a central longitudinal axis of the acoustic channel.

16. The device of claim 13, further comprising a processor coupled to the sound wave generator and the sound wave receiver and configured to:
cause the sound wave generator to produce the sound wave;
receive, from the sound wave receiver, a signal in response to the sound wave; and
determine a flow rate of the fluid based on the signal from the sound wave receiver.

17. The device of claim 13, wherein the sound wave is an ultrasonic sound wave.

18. The device of claim 13, wherein a cross-sectional area of each of the inlet chamber, the acoustic channel, and the outlet chamber is substantially the same.

19. The device of claim 13, wherein the inlet chamber includes a tapered portion that reduces the inlet chamber in a direction towards the acoustic channel.

20. The device of claim 13, wherein the inlet chamber includes a portion that extends beyond the acoustic channel such that the inlet chamber and the acoustic channel form a tee junction.

* * * * *